United States Patent
Teshima

[11] Patent Number: 5,867,346
[45] Date of Patent: Feb. 2, 1999

[54] DISK DRIVING SPINDLE MOTOR

[75] Inventor: Hiroyoshi Teshima, Tottori-ken, Japan

[73] Assignee: Matsushita Electric Industrial Co., Ltd., Japan

[21] Appl. No.: 947,824

[22] Filed: Oct. 8, 1997

Related U.S. Application Data

[63] Continuation of Ser. No. 661,636, Jun. 11, 1996, abandoned.

[30] Foreign Application Priority Data

Jun. 13, 1995 [JP] Japan .................................. 7-145996

[51] Int. Cl.$^6$ .......................... G11B 17/028; G11B 19/20
[52] U.S. Cl. ...................................... 360/99.08; 360/99.12
[58] Field of Search ............................ 360/99.12, 99.08, 360/98.08, 98.07, 99.04, 99.05; 310/67 R, 156; 369/258, 261, 263, 264, 270, 271, 282

[56] References Cited

U.S. PATENT DOCUMENTS

| | | | |
|---|---|---|---|
| 5,243,481 | 9/1993 | Dunckley et al. | 360/99.08 |
| 5,459,627 | 10/1995 | Peter | 360/99.12 |
| 5,552,650 | 9/1996 | Cap et al. | 360/99.08 |

FOREIGN PATENT DOCUMENTS

| | | | |
|---|---|---|---|
| 521437 | 1/1993 | European Pat. Off. | 360/99.08 |
| 2-280651 | 11/1990 | Japan . | |
| 3-212147 | 9/1991 | Japan . | |
| 3-285545 | 12/1991 | Japan . | |
| 4-251463 | 9/1992 | Japan . | |
| 4-251541 | 9/1992 | Japan . | |
| 4-251554 | 9/1992 | Japan . | |

*Primary Examiner*—David L. Ometz
*Attorney, Agent, or Firm*—Parkhurst & Wendel

[57] ABSTRACT

A disk driving spindle motor wherein a hub portion having a flange portion on which a disk is to be clamped is supported for rotation relative to a housing body and a rotor frame is attached to the flange portion, the hub portion being driven for rotation by magnetic repulsive action produced between the housing body and the rotor frame. A clearance extending from the outer to the inner periphery of the flange portion is formed between the abutment surfaces of the flange portion and the rotor frame. This structure results in decreased warping of a disk attached to a disk support surface.

4 Claims, 6 Drawing Sheets

DISK DRIVING SPINDLE MOTOR

This is a Continuation of application Ser. No. 08/661,636 filed Jun. 11, 1996, now abandoned.

FIELD OF THE INVENTION

The present invention relates to a spindle motor used in, for example, a photodisk device or a magnetic disk device, for driving small-sized disks, particularly 1.8-in., 2.5-in. and smaller disks. Particularly, it relates to the portion of a disk supporting surface which influences the flatness (warping) of an attached disk.

BACKGROUND OF THE INVENTION

Recently, there has been a trend for photodisk and magnetic disk devices to decrease in size and weight and increase in capacity. Popular use of notebook-sized personal computers has made it imperative to prepare spindle motors of small size and decreased thickness, and as the development of operating systems and applications advances, HDD devices (hard disk drivers) are required to have an increased capacity. Further, by decreasing the flight height of the head or by using an MR head, an increase in the capacity of small-sized thin HDD devices may be attained. To this end, it is necessary to minimize the warping;

This kind of spindle motor has a rotor frame attached to a hub formed with a support surface for the disk, said hub portion being driven for rotation by magnetic repulsive action produced between the housing body and the rotor frame.

If the processing accuracy of the top surface of said rotor frame is poor, or if there is a difference in thermal expansion coefficient due to a difference in material between the rotor frame and the hub portion, or if the contact surfaces of the rotor frame and hub portion are adhesively bonded, a deformation takes place in which the outer periphery of the flange portion which serves as the support surface of the hub portion for the disk rises above the level of the inner periphery, and a warp develops in the disk attached to the flange portion, adversely affecting the reading and writing of signals from and in the disk.

DISCLOSURE OF THE INVENTION

With the above in mind, an object of the present invention is to provide a spindle motor which is capable of reducing the warping of a disk attached to the flange portion.

The invention provides a disk driving spindle motor wherein a hub portion having a flange portion on which a disk is to be clamped is supported for rotation relative to a housing body and a rotor frame is attached to said flange portion, said hub portion being driven for rotation by magnetic repulsive action produced between said housing body and said rotor frame, said disk driving spindle motor being characterized in that a clearance extending from the outer to the inner periphery of said flange portion is formed between the abutment surfaces of said flange portion and said rotor frame to prevent the outer periphery of said flange portion and the rotor frame from abutting against each other.

Owing to this arrangement, the flange portion of the hub portion and the rotor frame do not contact each other throughout their surfaces. Therefore, the flange portion is immune to the influence of the processing accuracy of the top surface of the rotor frame. Further, even if the difference in thermal expansion coefficient between the rotor frame and the hub member produces a bimetal effect, the presence of the clearance ensures that the disk never warps when the flange portion deforms.

Further, since the center diameter of the disk support surface is greater than the center diameter of the flange portion of the hub portion, the disk support surface acts to press the disk against a spacer even if the flange portion deforms, resulting in clamping the outer periphery of the clamp portion of the disk, thereby suppressing the warping of the disk to enable reading and writing without any problem.

DESCRIPTION OF THE EMBODIMENTS

Embodiments of the invention will now be described with reference to FIGS. 1 through 4.

In addition, to clarify the subject matter of the present invention, a conventional example will first be described with reference to FIGS. 5 and 6.

Figure 5:
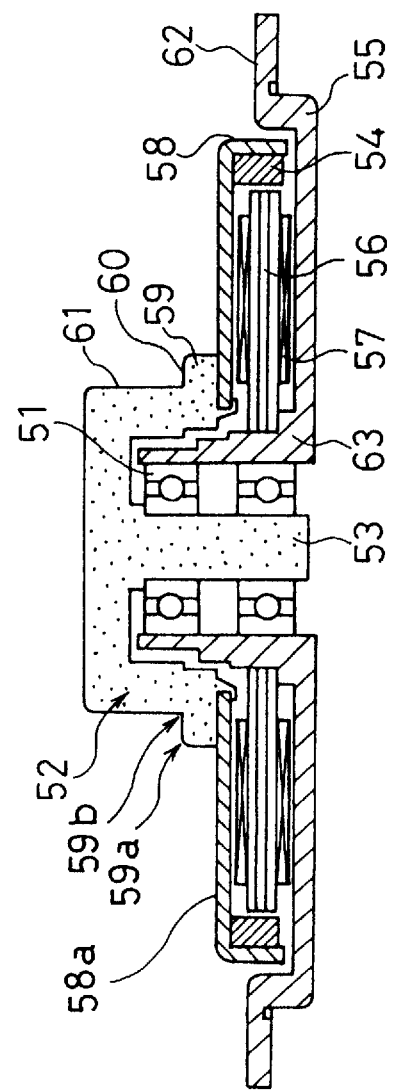
FIG. 5 is a sectional view of a conventional disk driving spindle motor.

A conventional disk driving spindle motor is constructed in the manner shown in FIG. 5.

This example is a spindle motor for a HDD (hard disk driver).

A housing 55 has a housing flange portion 62 formed around the outer periphery thereof, and a housing sleeve portion 63 formed in the middle thereof. A stator core 56 with a coil 57 wound thereon is attached to the outer periphery of the housing sleeve 63. A pair of bearings 51 are fixed on the inner side of the housing sleeve 63, and a hub portion 52 is rotatably supported by the housing 55 through the bearings 51.

The hub portion 52 is cylindrical and has a shaft portion 53 integrally formed in the middle on the inner side thereof, said shaft portion 53 being supported by the bearings 51.

The flange portion 59 formed around the outer periphery of the hub portion 52 has a rotor frame 58 fixed on the bottom thereon by caulking to cover the stator core 56 associated with the housing 55.

A magnet 54 is attached to the inner side of the rotor frame 58 at a position opposed to said stator core 56, and the magnetic repulsive action produced between the magnet 54 and the stator core 56 causes the hub portion 52 to rotate around the axis of the shaft portion 53.

The disk is supported on the disk support surface 60 of the flange portion 59 of the hub portion 52, and secured in position as it is positioned at its inner peripheral surface by the sleeve portion 61 of the hub portion 52.

In the case where the processing accuracy of the top surface 58a of the rotor frame 58 is poor thereby resulting in the middle portion thereof being disposed below the level of the outer peripheral portion, the outer peripheral portion 59a of the flange portion 59 is influenced by the processing accuracy of said rotor frame 58 thus producing a deformation. Namely outer peripheral portion 59a is raised above the level of the inner peripheral portion 59b.

In the case where such deformation develops in the flange portion 59 of the hub portion 52, a warp develops in the disk attached to the flange portion 59, adversely affecting the reading and writing of signals from and in the disk.

In addition, such influence is produced even in the case of a 3.5-in. HDD spindle motor. Particularly if the hub portion 52 is made smaller in size to have a lower mechanical strength than a 3.5-in. HDD spindle motor as in the case of a 2.5-in. or less HDD spindle motor, a larger magnitude of deformation is produced in the hub portion 52 under the influence of the processing accuracy of the rotor frame 58, producing a greater warp in the disk, often detracting from the quality of reading and writing.

Further, even if the processing accuracy of the rotor frame 58 is good, a deformation develops in the flange portion 59 of the hub portion 52 owing to the difference in material between the rotor frame 58 and the hub portion 52 when the environmental temperature changes, often detracting from the quality of reading and writing. Specifically, a heat run test (a writing evaluation test under variable temperature conditions) which is one of the shipment tests on HDD devices often shows poor writing.

Further, even if the processing accuracy of the rotor frame 58 is good, the use of an adhesive agent for bonding the contact surfaces of the rotor frame 58 and hub portion 52 often results in a greater warp developing in the disk, detracting from the quality of reading and writing. Specifically, in HDD devices, out-gas has to be avoided, and hence it is necessary to allow the adhesive agent to cure completely. Therefore, in allowing said adhesive agent to cure, heat is often added thereto to allow it to cure in a high temperature environment. However, this results in a deformation developing in the flange portion 59 attending the deformation of the adhesive agent which is caused when the adhesive agent is restored to the normal temperature upon completion of its curing, thus often detracting from the quality of reading and writing.

Figure 6:
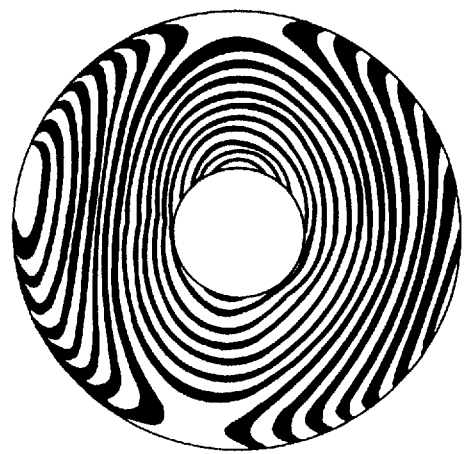
FIG. 6 shows the result of a measurement of warping of a disk attached to a conventional disk driving spindle motor.

FIG. 6 shows the result of a measurement of warping of a disk clamped to a conventional motor in which the rotor frame and hub portion are fixed together by caulking and high temperature adhesive curing, the measurement being made by using the interference effect of a laser. The greater the number of stripes, the greater the amount of the warp produced.

Further, in the case of a small-sized thin HDD spindle motor, since the strength of the flange portion 59 of the hub portion 52 is low, the flange portion 59 is deformed under the influence of the force with which the disk is clamped, producing an increased warp in the disk, often detracting from the quality of reading and writing.

Figure 1:
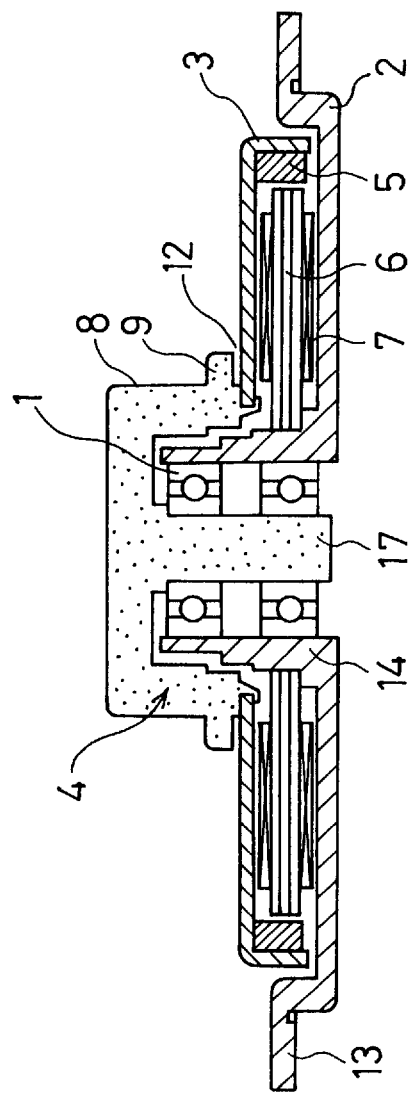
FIG. 1 is a sectional view of a disk driving spindle motor according to a first embodiment of the present invention.
Figure 2:
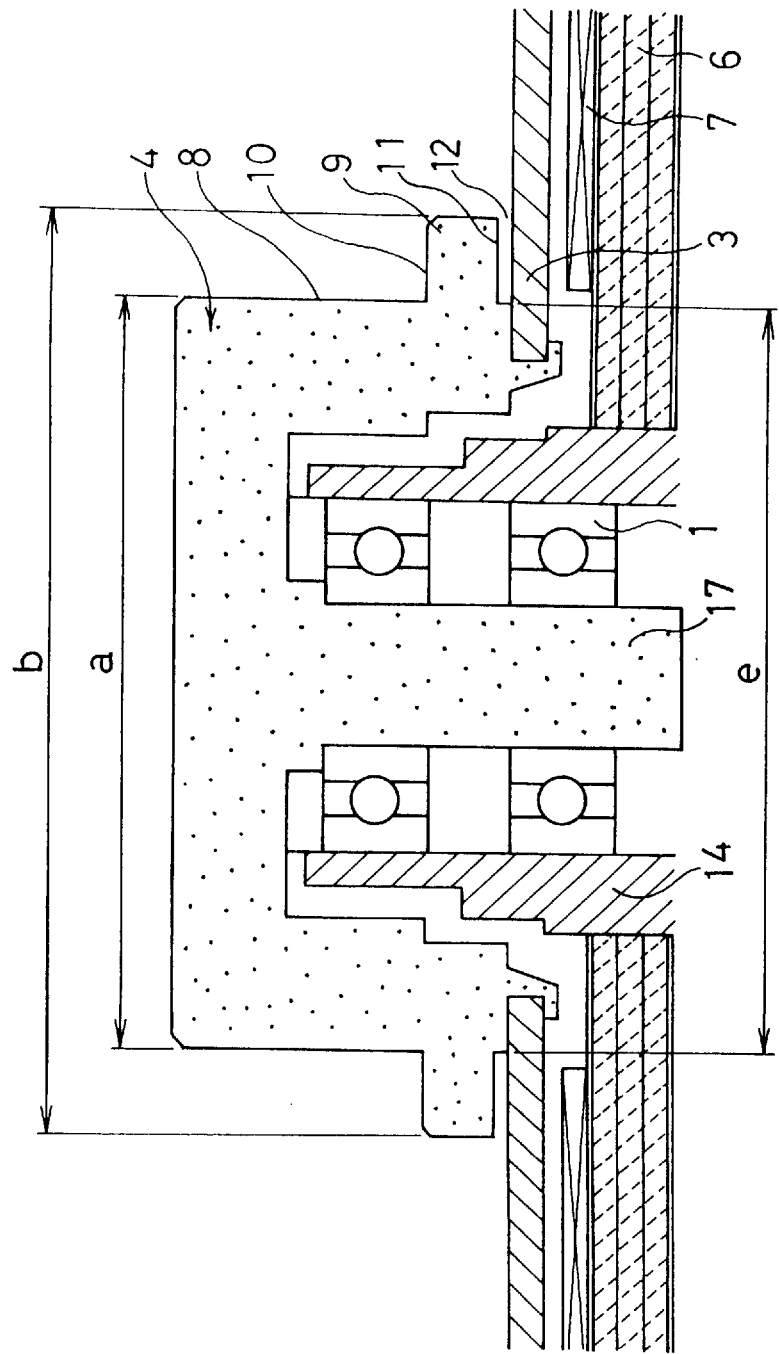
FIG. 2 is an enlarged view of a flange portion in a hub portion in the embodiment shown in FIG. 1.
Figure 3:
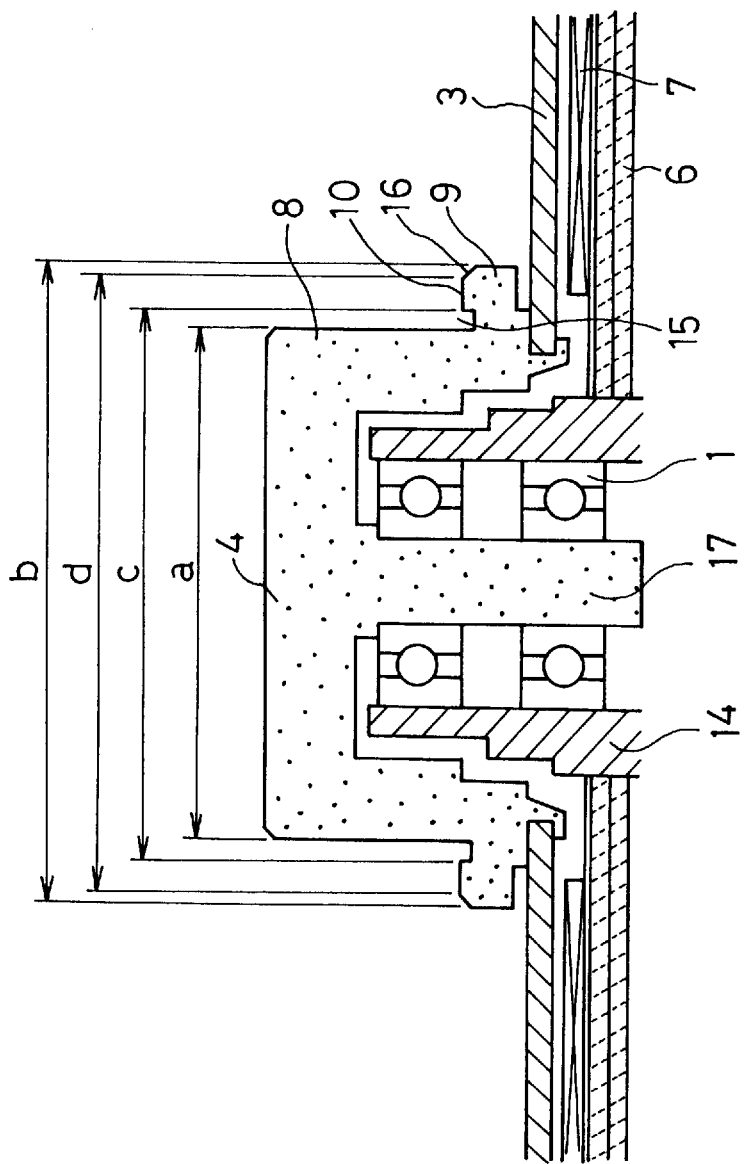
FIG. 3 is an enlarged view of the flange portion of a hub portion in a second embodiment of the present invention.

In contrast, the disk driving spindle motor of the present invention is constructed in the manner shown in FIGS. 1 through 3.

(First Embodiment)

FIGS. 1 and 2 show a first embodiment of the present invention.

A housing 2 has a housing flange portion 13 formed in the outer periphery thereof and a housing sleeve 14 formed in the middle thereof. Attached to the outer periphery of the housing sleeve 14 is a stator core 6 having a coil wound thereon. A pair of bearings 1 are fixed in the inner side of the housing sleeve 14, and a hub portion 4 is rotatably supported by the housing 2 through the bearings 1.

The hub 4 is cylindrical and has a shaft portion 17 integrally formed in the middle on the inner side thereof, said shaft portion 17 being supported by the bearings 1.

The flange portion 9 formed around the outer periphery of the hub portion 4 has a rotor frame 3 fixed on the bottom thereon by caulking to cover the stator core 6 associated with the housing 2.

A magnet 5 is attached to the inner side of the rotor frame 3 at a position opposed to said stator core 6, and the magnetic repulsive action produced between the magnet 5 and the stator core 6 causes the hub portion 4 to rotate around the axis of the shaft portion 17. Specifically, the magnet 5 is a cylindrical magnet having N and S poles alternately formed thereon circumferentially on the rotor frame 3, the arrangement being such that a current is passed through the coil 7 to produce a magnetic field in the projecting poles of the stator core 6, producing a torque between the stator core 6 and the field magnet 5 opposed thereto, thereby rotating the rotor frame 3. The disk is supported on the disk support surface 10 of the flange portion 9 of the hub portion 4, and secured in position as it is positioned at its inner peripheral surface by the sleeve portion 8 of the hub portion 4.

Further, formed between the abutment surfaces of the flange portion 9 and the rotor frame 3 is a clearance 12 extending from the outer to the inner periphery of the flange portion 9, the formation of said clearance 12 resulting in preventing the outer periphery of the flange portion 9 from abutting against the rotor frame 3. In FIG. 2, the counter disk support surface 11 of the flange portion 9 does not abut against the rotor frame 3.

The formation of such clearance 12 prevents the outer periphery of the flange portion which serves as the disk support surface from rising above the level of the inner periphery even if the processing accuracy of the top surface of the rotor frame 3 is poor, or even if there is a difference in thermal expansion coefficient due to the difference in material between the rotor frame 3 and the hub portion 4, or even if the contact surfaces of the rotor frame 3 and the hub portion 4 are adhesively bonded to each other. Therefore, there is no danger of a warp developing in the disk attached to the flange portion 9, thus ensuring good reading from and writing to the disk.

Further, in the case where the flange portion 9 is deformed by the force with which the disk is clamped, the provision of the clearance 12 between the flange portion and the rotor frame 3 prevents the deformed region of the flange portion 9 from contacting the rotor frame 3, ensuring that a uniform elastic force acts on the flange portion 9, which means that the disk clamp is stabilized.

The clearance 12 would be ineffective if it is in the form of a slight chamfering of the corner of the flange portion 9. Specifically, a clearance which satisfies the following relations is preferable.

As shown in FIG. 2, let a be the outer diameter of the sleeve portion 8 of the hub portion 4, b be the outer diameter of the flange portion 9, and e be the outer diameter of the contact regions of the rotor frame 3 and the hub portion 4. Then, it has been experimentally found that good results can be obtained when the relation $(\pi/4)\cdot((b\cdot b)-(a\cdot a))<4\cdot(\pi/4)\cdot((b\cdot b)-(e\cdot e))$ is satisfied.

(Second Embodiment)

FIG. 3 shows a second embodiment of the present invention. This second embodiment differs from the first embodiment only in the following points.

A relief 15 is formed in the inner peripheral side of the disk support surface 10 of the flange portion 9 of the hub portion 4. Further, a relief 16 is formed by chamfering the outer periphery of the disk support surface 10 of the flange portion 9.

The formation of the relief 15 provides a state in which the inner periphery of the attached disk does not contact the flange portion 9. Therefore, due to the relief 15, the reaction force produced in the flange portion 9 by the clamp force no longer acts on the inner periphery of the disk.

Further, the formation of the relief 16 prevents burrs left after the finishing of the hub portion 4 from affecting the disk support surface 10; thus, the relief 16 is effective in stabilizing the position of the disk support surface 10.

Specifically, a clearance which satisfies the following relation is preferable.

As shown in FIG. 3, let a be the outer diameter of the sleeve portion 8, b be the diameter of the flange portion 9, c be the disk contact inner diameter of the disk support surface 10 of the hub portion 4, and d be the disk contact outer peripheral diameter. Then the reliefs 15 and 16 are set to satisfy the relation $(a+b)/2 < (c+d)/2$, whereby the reaction force produced in the flange portion 9 to act on the disk has its point of action positioned outwardly of the center diameter of the flange surface and hence the clamp on the disk is stabilized.

In the case where disks are allowed to conform to the end surface of a spacer (not shown) used to form a clearance between the disks to reduce warps in the disks by the end surface accuracy of the spacer, it is desirable that the point of action is located on the outer periphery side, as described above. Particularly, in small-sized HDD devices for 2.5-in. or less, it is sometimes difficult to increase the rigidity of the flange portion; thus, it is desirable to employ the clamp system in which the relief shape is increased to decrease the rigidity of the flange portion 9 so as to rely on the rigidity of the spacer and on the end surface accuracy.

Figure 4:
FIG. 4 shows the result of a measurement of warping of a disk attached to the hub portion of the second embodiment.

FIG. 4 shows the result of a measurement, by the use of the interference effect of a laser, of warping of a disk attached to a spindle motor formed with a clearance 12 and reliefs 15 and 16 as in the second embodiment, it being seen that the warp in the disk is reduced in the environment in which it is used, as compared with FIG. 6.

As described so far, according to the invention, since the clearance 12 is provided to prevent the flange portion of the hub portion and the rotor frame from contacting each other throughout their surfaces, the flange portion 9 is not influenced by the processing accuracy of the top surface of the rotor frame 3. Further, even if the difference in thermal expansion coefficient between the rotor frame and the hub member produces a bimetal effect, the presence of the clearance 12 ensures that the flange portion deforms less when the rotor frame deforms, thereby producing less influence on the disk support surface 10 and thus a warp in the disk which makes reading and writing impossible never occurs.

Further, since the center diameter of the disk support surface is greater than the center diameter of the flange portion of the hub portion, the disk support surface acts to press the disk against the spacer, while the clamp force acts on the outer periphery of the clamp portion of the disk, suppressing the warping of the disk to enable reading and writing without any problem.

By changing the shape of the flange portion, it is possible to provide a small-sized HDD spindle motor which suppresses the warping of disks.

what is claimed is:

1. A disk driving spindle motor wherein a hub portion having a flange portion on which a disk is to be clamped is supported for rotation relative to a housing body and a rotor frame is attached to said flange portion, said hub portion being driven for rotation by magnetic repulsive action produced between said housing body and said rotor frame, said disk driving spindle motor, comprising:

a clearance extending from the outer toward the inner periphery of said flange portion formed directly between the abutment surfaces of said flange portion and said rotor frame to prevent the outer periphery of said flange portion and said rotor frame from abutting each other, the abutment surface of said flange portion constituting a counter disk support surface opposed from a disk support surface of said flange portion; and an annular groove having a depth at least as deep as a thickness of said rotor frame, said annular groove being formed radially inwardly from said clearance and being formed in a downward projecting portion of said flange portion for clamping an inner periphery of said rotor frame to said flange portion, wherein said flange portion is comprised of a material different from that of said rotor frame and whereby warping of any disk attached to said flange portion is reduced.

2. A disk driving spindle motor as set forth in claim 1, wherein the area of said abutment surface of said flange portion within said clearance is ¼ or more of the disk support surface area of said flange portion.

3. A disk driving spindle motor as set forth in claim 1, wherein the inner periphery of the disk support surface of said flange portion comprises a first relief to prevent the inner periphery of the disk from abutting said inner periphery of said flange portion.

4. A disk driving spindle motor as set forth in claim 3, wherein a is the outer diameter of a sleeve portion of the hub portion, b is the outer diameter of the flange portion of the hub portion, c is the disk contact inner diameter of the disk support surface of the blange portion, and d is the disk contact outer peripheral diameter of the disk support surface of the blange portion, and a, b, c and d satisfy the following relationship:

$(a+b)/2 < (c+d)/2$.

* * * * *